United States Patent
Saoyama

(10) Patent No.: US 10,634,202 B2
(45) Date of Patent: Apr. 28, 2020

(54) ELECTRIC LINEAR MOTION ACTUATOR AND ELECTROMECHANICAL BRAKE SYSTEM

(71) Applicant: NTN CORPORATION, Osaka (JP)

(72) Inventor: Yuki Saoyama, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/542,554

(22) PCT Filed: Jan. 8, 2016

(86) PCT No.: PCT/JP2016/050523
§ 371 (c)(1),
(2) Date: Jul. 10, 2017

(87) PCT Pub. No.: WO2016/114235
PCT Pub. Date: Jul. 21, 2016

(65) Prior Publication Data
US 2018/0017115 A1    Jan. 18, 2018

(30) Foreign Application Priority Data
Jan. 15, 2015   (JP) .................................. 2015-005960

(51) Int. Cl.
*F16D 65/18* (2006.01)
*F16D 125/50* (2012.01)
(Continued)

(52) U.S. Cl.
CPC .......... *F16D 65/18* (2013.01); *F16D 2121/24* (2013.01); *F16D 2125/40* (2013.01);
(Continued)

(58) Field of Classification Search
CPC ............. F16D 65/18; F16D 2200/0086; F16D 2127/06; F16D 2121/24; F16D 2125/40; F16D 2125/48; F16D 2125/50
See application file for complete search history.

(56) References Cited

U.S. PATENT DOCUMENTS

| | | | | |
|---|---|---|---|---|
| 6,189,482 B1 * | 2/2001 | Zhao | .................... | C23C 16/4401 118/715 |
| 2012/0325595 A1 * | 12/2012 | Malki | .................... | F16D 65/568 188/71.7 |

(Continued)

FOREIGN PATENT DOCUMENTS

| JP | 10241548 A | * | 9/1998 |
|---|---|---|---|
| JP | 2012-87889 | | 5/2012 |

(Continued)

OTHER PUBLICATIONS

International Preliminary Report on Patentability dated Jul. 18, 2017 in International Application No. PCT/JP2016/050523, with English-language translation.

*Primary Examiner* — Melody M Burch
(74) *Attorney, Agent, or Firm* — Wenderoth, Lind & Ponack, L.L.P.

(57) ABSTRACT

A locking mechanism capable of locking and unlocking the rotation of the rotor shaft of an electric motor is constituted by a plurality of recesses formed in one side surface of one gear of a plurality of gears of a reduction gear mechanism. A locking pin is movable toward and away from the recesses, and is configured such that when the locking pin moves toward the recesses, the locking pin engages in one of the recesses and locks the one gear. A linear solenoid is configured to move the locking pin toward and away from the recesses, and a protrusion extends from one end surface of each recess.

10 Claims, 8 Drawing Sheets

(51) Int. Cl.
 *F16D 121/24* (2012.01)
 *F16D 125/40* (2012.01)
 *F16D 125/48* (2012.01)
 *F16D 127/06* (2012.01)

(52) U.S. Cl.
 CPC ...... *F16D 2125/48* (2013.01); *F16D 2125/50* (2013.01); *F16D 2127/06* (2013.01); *F16D 2200/0086* (2013.01)

(56) References Cited

U.S. PATENT DOCUMENTS

2013/0186717 A1 7/2013 Muramatsu et al.
2015/0345602 A1 12/2015 Funada et al.
2016/0131212 A1 5/2016 Yamasaki et al.
2016/0369881 A1 12/2016 Okuno et al.

FOREIGN PATENT DOCUMENTS

| JP | 2015-1238 | 1/2015 |
| WO | 2014/069516 | 5/2014 |
| WO | 2015/001894 | 1/2015 |

* cited by examiner

ELECTRIC LINEAR MOTION ACTUATOR AND ELECTROMECHANICAL BRAKE SYSTEM

TECHNICAL FIELD

The present invention relates to an electric linear motion actuator for linearly driving a driven member such as a brake pad, and to an electromechanical brake system in which the electric linear motion actuator is used.

BACKGROUND ART

Japanese Unexamined Patent Application Publication No. 2012-87889 discloses an electric linear motion actuator driven by an electric motor, and configured such that the rotation of the rotor shaft of the electric motor is reduced in speed by a reduction gear mechanism and input to a rotary shaft. The rotation of the rotary shaft is converted by a rotation-to-linear motion converting mechanism to the linear motion of a sliding member axially movable along the inner diameter surface of a housing, thereby axially moving the sliding member.

A plurality of engagement holes are formed in one side surface of one gear of the reduction gear mechanism, while spaced apart from each other on one pitch circle having the center axis about which the one gear rotates. When a locking pin movable toward and away from one point on the one pitch circle is advanced by a linear solenoid until the locking pin engages in one of the engagement holes, the sliding member is locked at an arbitrary axial position.

By using the electric linear motion actuator configured as described above in an electromechanical brake system, when the vehicle is parked, with a brake pad advanced by the sliding member pressing a disk rotor with a predetermined pressing force, the brake pad can be locked such that the vehicle is kept in a stationary state. In this way, such an electromechanical brake system can have a parking brake function.

In the electric linear motion actuator disclosed in JP Publication No. 2012-87889 noted above, it takes a lot of time and costs a lot to form engagement holes in the one gear by means of cutting. By forming the one gear by sintering a metal, costs can be reduced, but grease used to lubricate the reduction gear mechanism is likely to go into the engagement holes. If grease goes into the engagement holes, due to pumping action, i.e. the forward and backward movements of the plunger of the linear solenoid, the grease might be sucked into the linear solenoid, thereby causing the function of the linear solenoid to deteriorate.

In order to overcome this problem, by forming engagement holes comprising recesses, it is possible to prevent grease from going into the engagement holes, and thus to prevent the function of the linear solenoid from deteriorating. Also, by forming the one gear by sintering a metal, costs can be reduced. However, recesses formed when forming the one gear of JP Publication No. 2012-87889 by sintering a metal are not sufficiently deep, i.e., only about several millimeters deep at the most, so that it is impossible to ensure a sufficient length of engagement between the locking pin and such shallow recesses. Therefore, it is impossible to form the one gear by sintering a metal, and to reduce costs while preventing the function of the linear solenoid from deteriorating.

SUMMARY OF THE INVENTION

It is an object of the present invention to reduce costs for an electric linear motion actuator having a locking function, i.e., configured such that when a locking pin engages in one of the engagement holes formed in one side surface of a gear of a reduction gear mechanism, a sliding member is locked at an arbitrary axial position, and to prevent the function of a linear solenoid from deteriorating.

In order to achieve the above object, the present invention provides an electric linear motion actuator according to a first embodiment comprising: an electric motor having a rotor shaft; a reduction gear mechanism comprising a plurality of gears including an output gear, and configured such that a rotation of the rotor shaft of the electric motor is reduced in speed and output by the reduction gear mechanism; a rotation-to-linear motion converting mechanism configured to convert a rotational motion of the output gear of the reduction gear mechanism to an axial linear motion of an axially movably supported sliding member; and a locking mechanism capable of locking and unlocking the rotation of the rotor shaft of the electric motor, wherein the locking mechanism comprises: a plurality of engagement portions formed in one gear of the plurality of gears of the reduction gear mechanism other than the output gear; a locking pin movable toward and away from the engagement portions, and configured such that when the locking pin moves toward the engaging portions, the locking pin engages in one of the engagement portions, and locks the one gear; and a pin driving actuator configured to move the locking pin toward and away from the engagement portions. The engagement portions comprise recesses having first end surfaces configured such that when the locking pin engages with any one of the first end surfaces, the one gear is locked by the locking mechanism, wherein a protrusion extends from the first end surface of each of the recesses, and wherein the one gear is formed by sintering a metal.

The present invention also provides an electromechanical brake system comprising: a brake pad; a disk rotor; and an electric linear motion actuator configured to linearly drive the brake pad such that the brake pad is pressed against the disk rotor, thereby applying a braking force to the disk rotor. The electric linear motion actuator comprises the electric linear motion actuator according to the first embodiment, and the sliding member of the electric linear motion actuator according to the first embodiment is configured to linearly drive the brake pad.

The above electromechanical brake system is configured such that when the electric motor of the electric linear motion actuator is activated, the rotation of the rotor shaft of the electric motor is reduced in speed by the reduction gear mechanism, and output from the output gear, and the rotation of the output gear is converted by the rotation-to-linear motion converting mechanism to the linear motion of the sliding member. Therefore, when the sliding member moves forward, the brake pad, coupled to the sliding member, is pressed against the disk rotor, thereby applying a braking force to the disk rotor.

To park the vehicle, with the brake pad pressed against the disk rotor so that a braking force necessary for parking is applied to the disk rotor as described above, the locking pin is advanced by activating the linear solenoid until the locking pin engages in one of the engagement portions of the one gear, so that the one gear is locked. With the one gear locked, by de-energizing the electric motor, it is possible to reduce the wasteful consumption of electric energy.

By providing a protrusion extending from the first end surface of each recess as in the electric linear motion actuator according to the first embodiment, even if the recesses are shallow recesses formed simultaneously when forming the one gear by sintering a metal, and each having a depth of merely about several millimeters, it is possible to ensure a sufficient length of engagement between the locking pin and the first end surface of each recess including the protrusion. Therefore, the one gear can be formed by sintering a metal. Since the engagement portions, in which the locking pin engages, comprise recesses having closed end walls, it is possible to prevent grease for gear lubrication from going into the recesses, and thus to prevent grease from being sucked into the linear solenoid through the recesses.

The protrusions may be formed such that a space is defined between the protrusion of one of each circumferentially adjacent pair of the recesses and a second end surface of the other of the circumferentially adjacent pair of the recesses. Alternatively, the protrusion extending from the first end surface of one of each circumferentially adjacent pair of the recesses extends up to the second end surface of the other of the circumferentially adjacent pair of the recesses. The latter protrusions have higher strength and durability.

If the second end surface of each of the recesses comprises a tapered surface, when the one gear rotates in a braking direction in which a braking force increases, the tapered surface can press the distal end of the locking pin such that the locking pin is reliably retracted to the disengagement position, and also the one gear is smoothly rotated in the braking direction.

While, as described above, the electric linear motion actuator according to the first embodiment is configured such that the engagement portions comprise recesses having first end surfaces, a protrusion extends from the first end surface of each of the recesses, and the one gear can be formed by sintering a metal, an electric linear motion actuator according to a second embodiment is configured such that the one gear is formed with through holes. The engagement portions comprise recesses each formed by attaching a lid to one of two open end portions of a corresponding one of the through holes which is remoter from the locking pin than is the other of the two open end portions thereof so that the recesses are each located in the other of the two open end portions of the corresponding one of the through holes, and the one gear is formed by sintering a metal.

In the electric linear motion actuator according to the second embodiment, too, since recesses can be each formed as the engagement portion by closing the corresponding through hole due to the attachment of a lid to one of the two open end portions of the through hole which is remoter from the locking pin than is the other of the two open end portions thereof, the recesses being each located in the other of the two open end portions of the through hole, the one gear can be formed by sintering a metal. Also, it is possible to prevent grease for gear lubrication from going into the through holes, and thus to effectively prevent grease from being sucked into the linear solenoid.

By forming the lids of a resin or a metal, it is possible to reduce costs. The lids may include the recesses as engagement portions configured such that the locking pin engages in and disengages from one of the engagement portions. Also, in order to reliably move the locking pin to the disengagement position, and smoothly rotate the one gear in the braking direction in which a braking force increases, the lids may be each formed with a tapered surface configured to apply to the locking pin an axial force that tends to retract the locking pin when the one gear rotates in the braking direction.

Since the one gear can be formed by sintering a metal in both of the first and second embodiments of the present invention, it is possible to reduce costs. Also, since as engagement portions configured such that the locking pin engages in and disengages from one of the engagement portions, recesses each having an closed end wall are formed, it is possible to prevent grease from going into the linear solenoid, and thus to prevent the function of the linear solenoid from deteriorating.

DETAILED DESCRIPTION OF THE INVENTION

Figure 1:
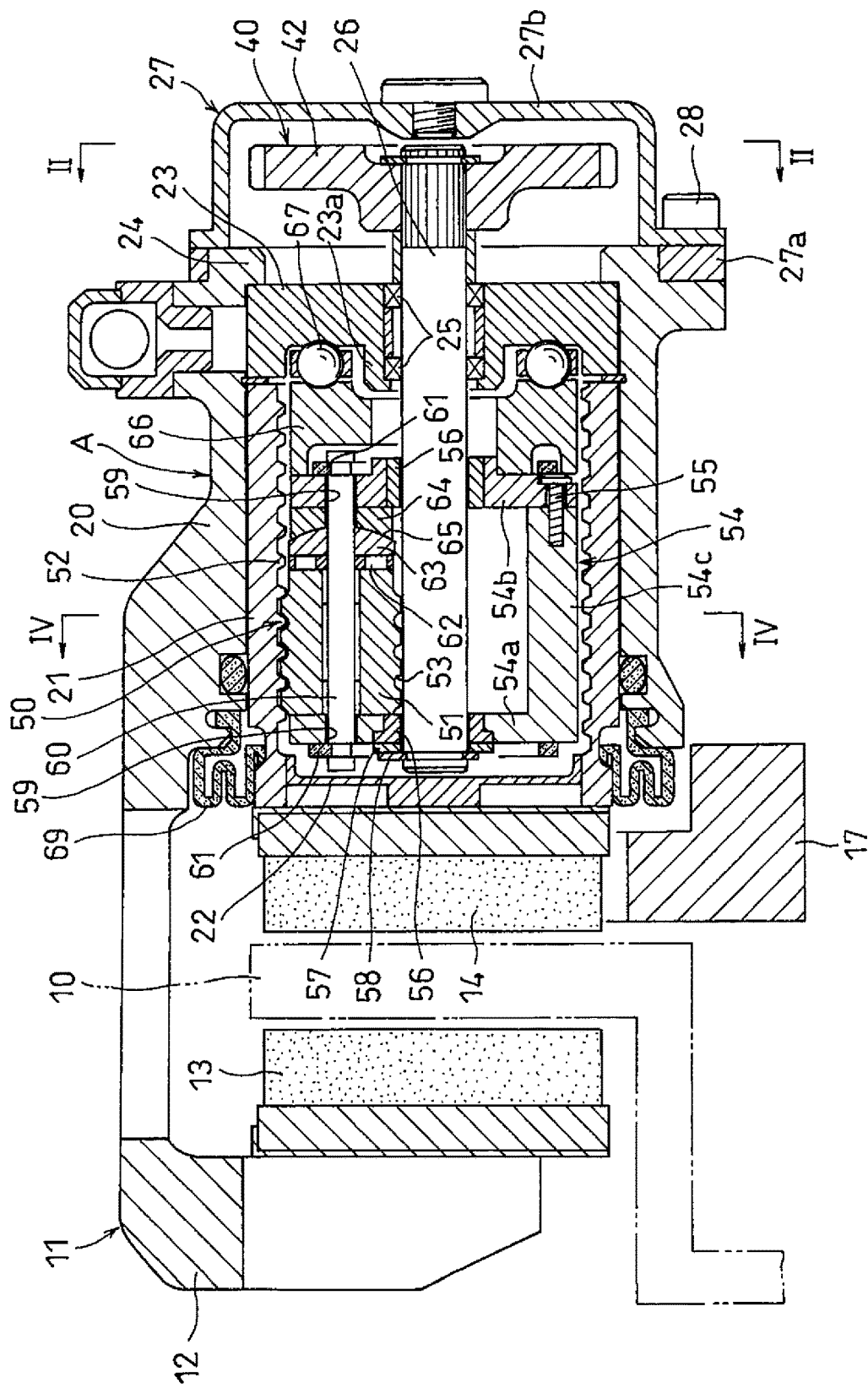
FIG. 1 is a vertical sectional view of an electromechanical brake system which embodies the present invention, and in which an electric linear motion actuator according to the present invention is used.
Figure 2:
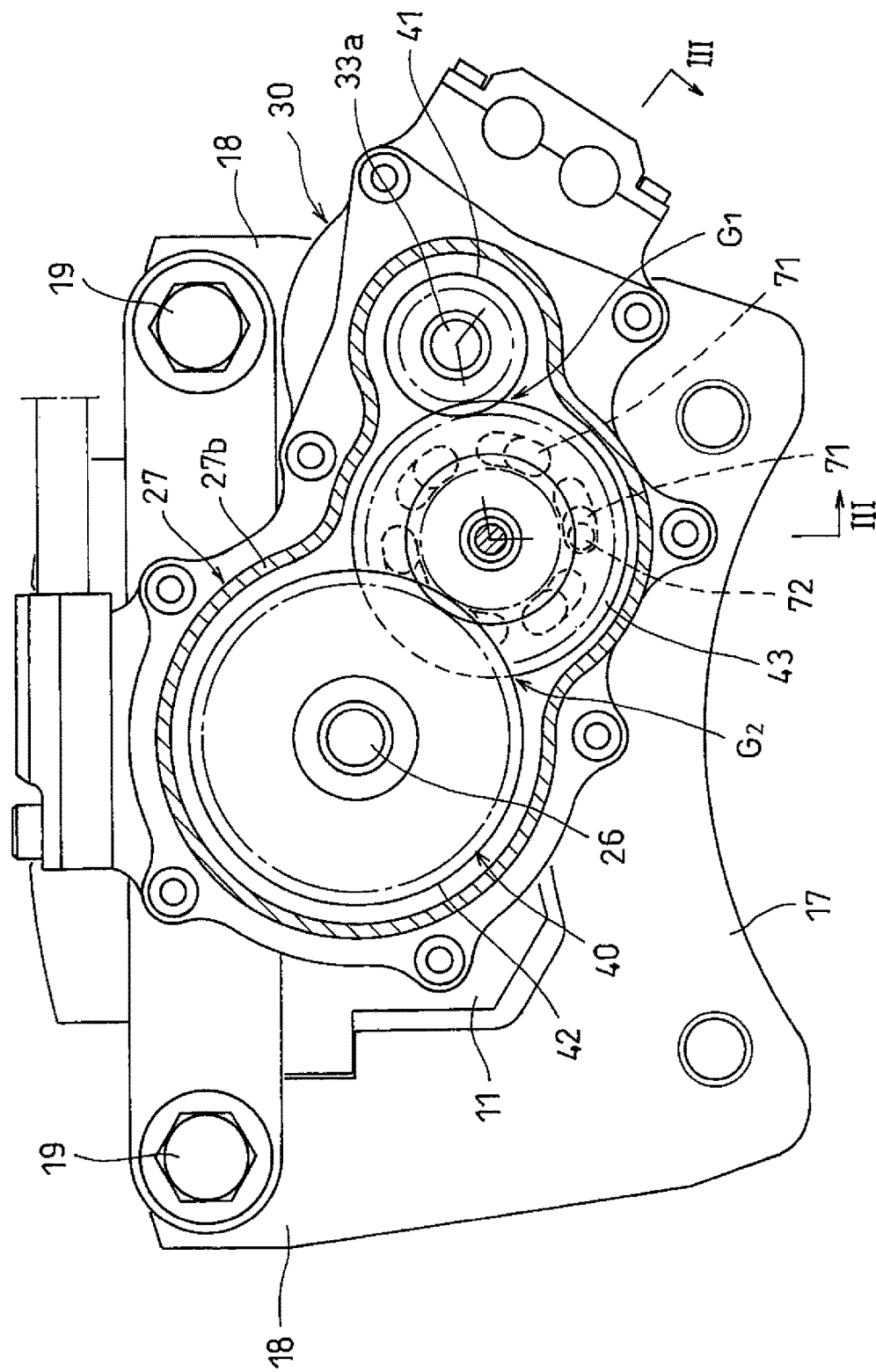
FIG. 2 is a sectional view taken along line II-II of FIG. 1.

The embodiment of the present invention is now described with reference to the drawings. FIGS. 1 and 2 illustrate an electromechanical brake system including a disk rotor 10 configured to rotate together with a wheel (not shown), a caliper 11 provided near the outer peripheral portion of the disk rotor 10, and having a claw portion 12 provided at one end portion of the caliper 11 and axially opposed to the outer peripheral portion of the outboard surface of the disk rotor 10, and an outboard brake pad 13 supported by the claw portion 12.

The electromechanical brake system further includes an inboard brake pad 14 opposed to the outer peripheral portion of the inboard surface of the disk rotor 10, and an electric linear motion actuator A provided at the other end portion of the caliper 11, and configured to move the inboard brake pad 14 toward the disk rotor 10.

A mount 17 is provided near the outer peripheral portion of the inboard surface of the disk rotor 10, and is fixed in position by being supported by a knuckle (not shown). As illustrated in FIG. 2, the mount 17 is provided on both side portions thereof with a pair of pin supporting pieces 18 opposed to each other. The pin supporting pieces 18 are each provided at one end thereof with a slide pin 19 extending in the direction orthogonal to the disk rotor 10 such that the caliper 11 is slidably supported by the slide pins 19.

Though not illustrated in detail in the drawings, the mount 17 supports the outboard and inboard brake pads 13 and 14 such that the brake pads 13 and 14 are movable toward the disk rotor 10, but are non-rotatable (rotationally fixed).

As illustrated in FIG. 1, the electric linear motion actuator A includes a cylindrical housing 20 integral with the other end of the caliper 11, and an outer ring member 21, as a sliding member, mounted in the housing 20 and supported to be axially movable along the inner diameter surface of the housing 20. The opening of the outer ring member 21 at its outboard end is closed by a cap 22 attached to the outer ring member 21. The inboard brake pad 14 has protrusions fitted in engagement grooves formed in the outboard end of the outer ring member 21 so that the outer ring member 21 is non-rotatable relative to the housing 20. The inboard brake pad 14 is non-rotatable but movable in the axial direction, relative to the mount 17.

A shaft supporting member 23 is mounted in the housing 20 on the inboard side of the inboard end of the outer ring member 21. The shaft supporting member 23 is a disk-shaped member having a boss portion 23a at its center. An annular protrusion 24 is formed on the inner periphery of the inboard end of the housing 20 so as to prevent the shaft supporting member 23 from moving out of the housing 20 through the inboard end of the housing 20.

A pair of rolling bearings 25 are mounted in the boss portion 23a of the shaft supporting member 23 so as to be axially spaced apart from each other, and rotatably support a driving shaft 26 arranged on the center axis of the outer ring member 21.

The inboard end of the driving shaft 26 is located in a gear case 27 attached to the inboard end of the hosing 20. The gear case 27 is constituted by a base plate 27a, and a cover 27b covering the surface of the base plate 27a. The gear case 27 is fixed to the housing 20 by tightening bolts 28 screwed into the inboard end of the housing 20 from the surface of the cover 27b.

Figure 3:
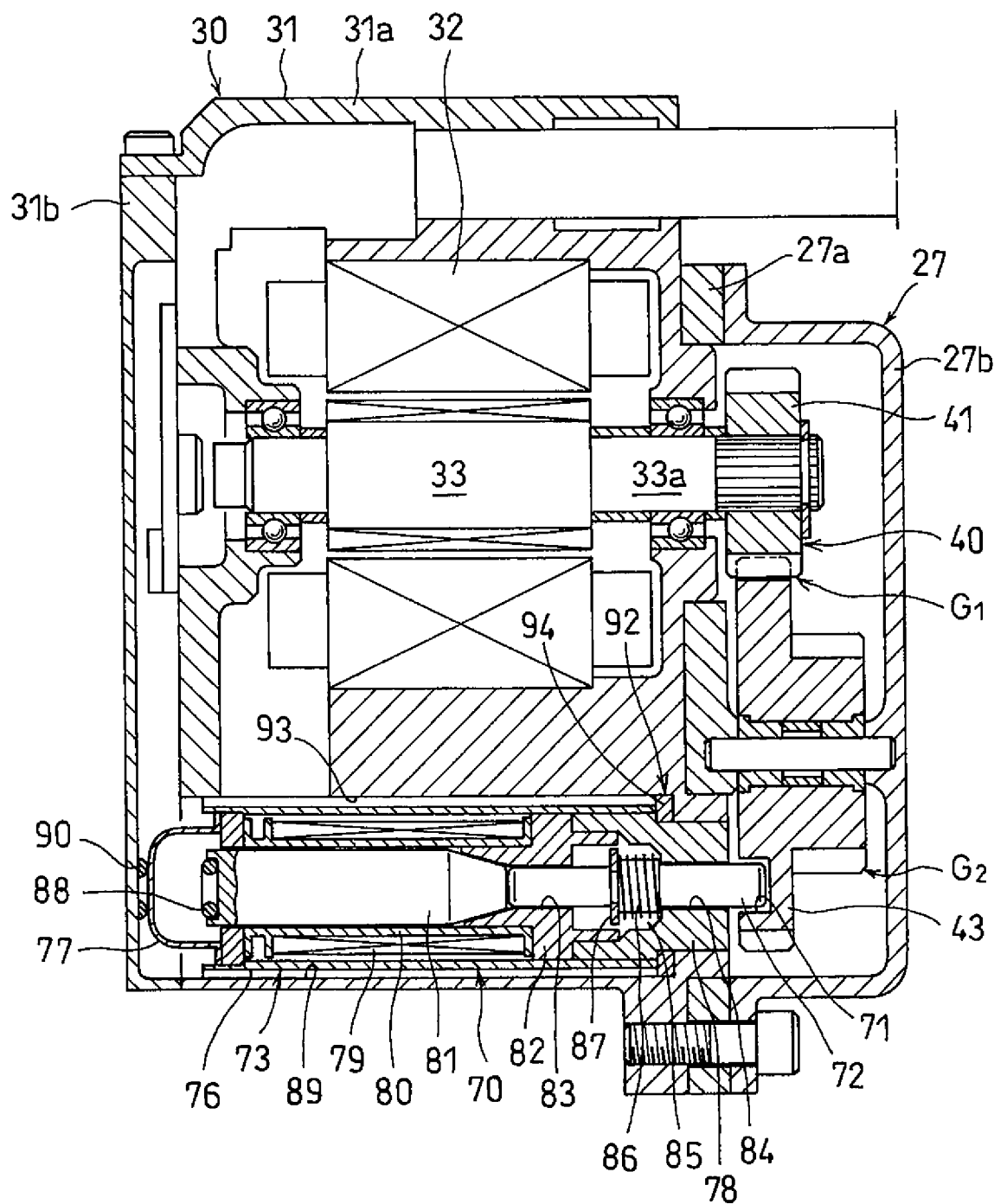
FIG. 3 is a sectional view taken along line III-III of FIG. 2.

As illustrated in FIG. 3, an electric motor 30 is supported by the base plate 27a of the gear case 27. The electric motor 30 includes a stator 32 mounted in a motor case 31, and a rotor 33 having a rotor shaft 33a and mounted inside of the stator 32. The rotation of the rotor shaft 33a of the rotor 33 is transmitted to the driving shaft 26 through a reduction gear mechanism 40 (power transmission path) mounted in the gear case 27.

As illustrated in FIG. 1, a rotation-to-linear motion converting mechanism 50 is provided between the driving shaft 26 and the outer ring member 21 so as to convert the rotational motion of the driving shaft 26 to the axial linear motion of the outer ring member 21.

Figure 4:
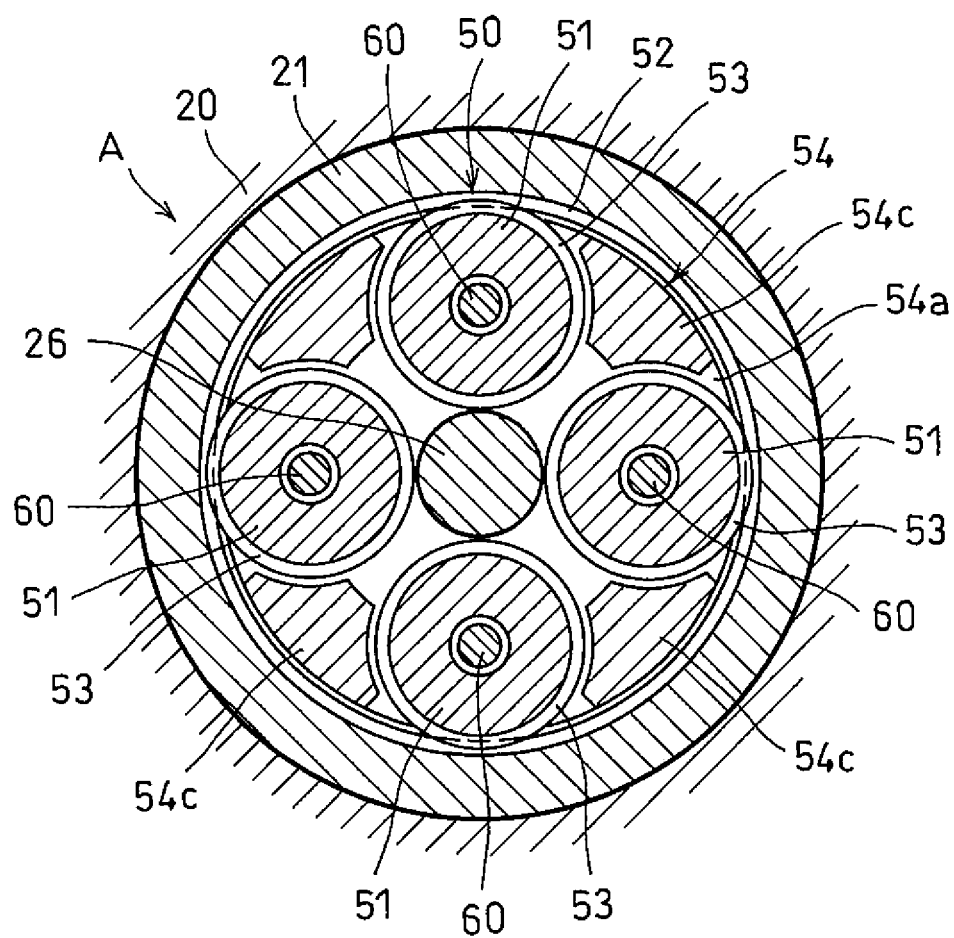
FIG. 4 is a sectional view taken along line IV-IV of FIG. 1.

As illustrated in FIGS. 1 and 4, the rotation-to-linear motion converting mechanism 50 includes planetary rollers 51 mounted between the outer ring member 21 and the driving shaft 26, and each formed in its outer periphery with circumferential grooves 53. The outer ring 21 has on the inner periphery thereof a helical rib 52 having the same pitch as that of the circumferential grooves 53 and engaged in the circumferential grooves 53. Thus, when the driving shaft 26 rotates, due to the contact of the planetary rollers 51 with the driving shaft 26, the planetary rollers 51 rotate about their respective axes while revolving around the driving shaft 26, thereby moving the outer ring member 21 in the axial direction. The circumferential grooves 53 of each planetary roller 51 may be replaced by a helical groove having the same pitch as that of the helical rib 52 and a lead angle different from that of the helical rib 52.

The planetary rollers 51 are rotatably supported by a carrier 54 supported to be rotatable about the driving shaft 26. The carrier 54 includes a pair of outboard and inboard disks 54a and 54b axially opposed to each other, and a plurality of space adjusting members 54c provided on the outer peripheral portion of one surface of the outboard disk 54a to extend toward the inboard disk 54b, while being circumferentially spaced apart from each other. The disks 54a and 54b are coupled together by tightening screws 55 screwed into the end surfaces of the respective space adjusting members 54c.

As illustrated in FIG. 1, the disks 54a and 54b are rotatably supported by sliding bearings 56 mounted between the driving shaft 26 and the respective disks 54a and 54b. The sliding bearing 56 rotatably supporting the outboard disk 54a is prevented from separating by a washer 57 fitted on the outboard end of the driving shaft 26 and a snap ring 58 attached to the outboard end of the driving shaft 26.

Each of the disks 54a and 54b is formed with circumferentially spaced apart shaft inserting holes 59 in the form of elongated holes each axially opposed to the corresponding hole 59 formed in the other of the disks 54a and 54b. The respective planetary rollers 51 are rotatably supported by a plurality of roller shafts 60 each having both end portions slidably supported in the corresponding axially opposed pair of shaft inserting holes 59.

The roller shafts 60 are radially inwardly biased by elastic rings 61 each wrapped around the respective ends of the roller shafts 60 so that the planetary rollers 51 are brought into pressure contact with the outer diameter surface of the driving shaft 26.

From the side of the planetary rollers 51, a thrust bearing 62, a pressure applying plate 63, and a pressure receiving plate 64 are mounted between the axially opposed portions of the inboard disk 54b of the carrier 54 and each planetary roller 51. The pressure applying plate 63 is in contact with the pressure receiving plate 64 through spherical seats 65. A gap is defined between the fitting surfaces of the pressure receiving plate 64 and the roller shaft 60 so that the roller shaft 60 and the pressure applying plate 63 are movable within this gap for alignment.

A backup plate 66 and a thrust bearing 67 are mounted between the inboard disk 54b of the carrier 54 and the shaft supporting member 23, which rotatably supports the driving shaft 26. The thrust bearing 67 supports the axial reaction force applied to the carrier 54 from the outer ring member 21 through the planetary rollers 51.

As illustrated in FIG. 1, the outboard opening of the housing 20 is closed by a bellows 69 mounted between the outboard end of the outer ring member 21 and the housing 20.

As illustrated in FIGS. 2 and 3, the reduction gear mechanism 40 is configured such that the rotation of an input gear 41 attached to the rotor shaft 33a of the electric motor 30 is reduced in speed in a stepwise manner by first and second reduction gear trains G1 and G2, and transmitted to an output gear 42 attached to the inboard end of the driving shaft 26 so as to rotate the driving shaft 26. The electric linear motion actuator further includes an electric locking mechanism 70 configured to keep the reduction gear mechanism 40 in the locked state in which power cannot be transmitted, while the vehicle is parked. The electric locking mechanism 70, as well as the electric motor 30, is mounted in the motor case 31 so that the electric motor 30 and the electric locking mechanism 70 form a single unit.

As illustrated in FIG. 3, the motor case 31 is constituted by a case body 31a, and a detachable lid 31b for closing the opening of the case body 31a. After the electric locking mechanism 70 is mounted in the case body 31a, the lid 31b is attached to the case body 31a.

Figure 5:
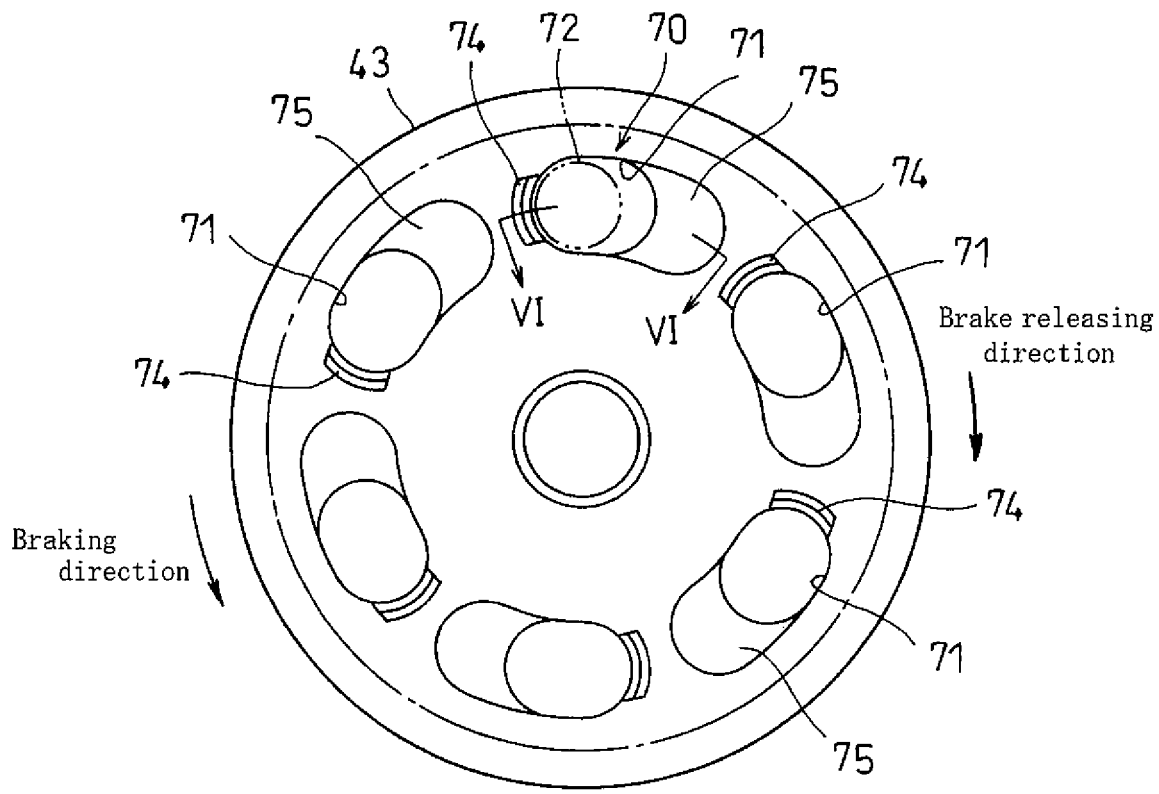
FIG. 5 is a front view of a gear in which engagement portions are formed.
Figure 6:
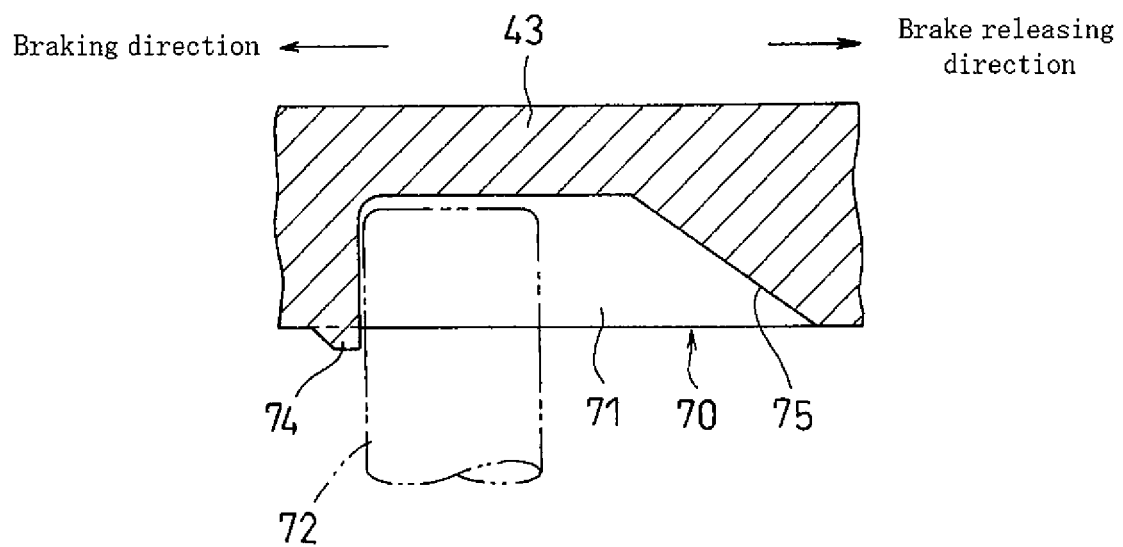
FIG. 6 is a sectional view taken along line VI-VI of FIG. 5.

As illustrated in FIGS. 3, 5, and 6, the electric locking mechanism 70 includes a plurality of circular arc-shaped recesses 71, as engagement portions, formed in one side surface of an intermediate gear 43 on the output side of the first reduction gear train $G_1$ such that the recesses 71 are arranged on a common circle while being equidistantly spaced apart from each other; a locking pin 72 movable toward and away from one point on the pitch circle of the recesses 71; and a linear solenoid 73, which serves as a pin driving actuator for moving the locking pin 72 toward and away from the above pitch circle so that when the locking pin 72 engages in one of the recesses 71, the intermediate gear 43 is locked.

The intermediate gear 43 is formed by sintering a metal. By forming the gear 43 by sintering, it is possible to form the recesses 71 simultaneously when forming the intermediate gear 43 by sintering, and thus to reduce the manufacturing cost compared to forming the recesses 71 by cutting. However, recesses 71 formed simultaneously when forming the gear 43 by sintering are not sufficiently deep, i.e., only about several millimeters deep at the most, so that it is impossible to ensure a sufficient length of engagement between the locking pin 72 and such shallow recesses 71.

To avoid this problem, in this embodiment, as illustrated in FIGS. 5 and 6, a protrusion 74 is formed on the surface of the intermediate gear 43 opposed to the locking pin 72 to extend from the front end surface of each recess 71 when the intermediate gear 43 rotates in the braking direction in which the braking force increases, i.e., the end surface of the recess 71 with which the locking pin 72 engages to lock the locking mechanism 70 (this end surface is hereinafter simply referred to as "the first end surface"). The other (second) end surface of each of the recess 71 has a tapered surface 75 configured to apply to the locking pin 72 an axial force that tends to retract the locking pin 72 (i.e., move the locking pin 72 axially out of the recess 71) when the intermediate gear 43 rotates in the braking direction.

As illustrated in FIG. 3, the linear solenoid 73 includes a cylindrical case 76 having a tail-side opening closed by an end plate 77 and a head-side opening closed by a head cap 78; a coil 79 mounted inside of the case 76; and a plunger 81 slidably mounted inside of a cylindrical bobbin 80 supporting the inner diameter surface of the coil 79.

A magnetic attraction core 82 is mounted in the case 76 so as to be axially opposed to the head cap 78. Pin holes 83 and 84 are coaxially formed in the magnetic attraction core 82 and the head cap 78, respectively. The locking pin 72, which is formed separately from the plunger 81, is inserted through the pin holes 83 and 84 so as to be slidably supported and guided in the pin holes 83 and 84 at two axially separate portions thereof.

A return spring 86 is received in a spring receiving space 85 defined between the opposed surfaces of the head cap 78 and the magnetic attraction core 82, and presses a snap ring 87 attached to the outer periphery of the locking pin 72, thereby biasing the locking pin 72 and the plunger 81 in the direction in which the locking pin 72 is disengaged from the intermediate gear 43 (i.e., out of the recess 71).

The bobbin 80, which supports the coil 79, is made of a resin or copper. The plunger 81 and the magnetic attraction core 82 are made of a ferromagnetic material so that the coil 79, the plunger 81, and the magnetic attraction core 82 form a magnetic circuit.

The locking pin 72 and the head cap 78 are made of a nonmagnetic material so as to prevent the leakage of magnetism.

An elastic member 88 is provided on the tail surface of the plunger 81, which is opposed to the end plate 77. When the plunger 81 is moved backward toward the end plate 77 by the elastic force of the return spring 86, the elastic member 88 abuts against the end plate 77 and elastically deforms. This elastic deformation alleviates the impact force generated when the elastic member 88 abuts against the end plate 77.

The linear solenoid 73 is fitted in a cylindrical, solenoid receiving hole 89 formed in the case body 31a. An elastic member 90 is provided on the inner surface of the lid 31b, which closes the opening of the case body 31a. The elastic member 90 axially presses the tail portion of the linear solenoid 73 so as to prevent the linear solenoid 73 from moving backward.

As illustrated in FIG. 3, an anti-rotation member 92 for rotationally fixing the linear solenoid 73 is provided between the solenoid receiving hole 89 and the linear solenoid 73.

The anti-rotation member 92 includes an axially extending engagement groove 93 formed in the inner periphery of the solenoid receiving hole 89, and an anti-rotation protrusion 94 formed on the outer periphery of the head-side end portion of the linear solenoid 73, and engaged in the engagement groove 93 to prevent the rotation of the linear solenoid 73.

FIG. 3 illustrates the locked state of the electromechanical brake system of the embodiment, in which the intermediate gear 43 is locked due to the engagement of the locking pin 72 in one of the recesses 71. While the automobile is traveling, however, the locking pin 72 is out of any of the recesses 71, so that the brake system is in the unlocked state.

In this unlocked state, i.e., while the locking pin 72 is disengaged, when the electric motor 30 illustrated in FIG. 3 is activated, the rotation of the rotor shaft 33a of the electric motor 30 is transmitted to the driving shaft 26, illustrated in FIG. 1, after being reduced in speed in the reduction gear mechanism 40.

Since the outer diameter surfaces of the planetary rollers 51 are in elastic contact with the outer diameter surface of the driving shaft 26, when the driving shaft 26 rotates, due to the frictional contact of the planetary rollers 51 with the driving shaft 26, the planetary rollers 51 rotate about their respective axes while revolving around the driving shaft 26.

At this time, since the helical rib 52, which is formed on the inner diameter surface of the outer ring member 21, is engaged in the circumferential grooves 53, which are formed in the outer diameter surfaces of the respective planetary rollers 51, the outer ring member 21 axially moves due to the engagement of the helical rib 52 in the circumferential grooves 53. Therefore, the inboard brake pad 14, which is fixedly coupled to the outer ring member 21, abuts against the disk rotor 10 and begins to axially press the disk rotor 10. The reaction force to this pressing force moves the caliper 11 in the direction in which the outboard brake pad 13, which is attached to the claw portion 12, approaches the disk rotor 10, so that the outboard brake pad 13 abuts against the disk rotor 10. As a result thereof, the outboard and inboard brake pads 13 and 14 strongly sandwich the outer peripheral portion of the disk rotor 10, thereby applying a braking force to the disk rotor 10.

To park the vehicle, with the disk rotor 10 sandwiched by the outboard and inboard brake disks 13 and 14 so that a braking force is applied to the disk rotor 10 as described above, the coil 79 of the linear solenoid 73, illustrated in FIG. 3, is energized so that the coil 79, the plunger 81, and the magnetic attraction core 82 form a magnetic circuit, and a magnetic attraction force is applied to the plunger 81 from the magnetic attraction core 82. As a result, the plunger 81 is moved toward, and attracted to, the magnetic attraction core 82.

At this time, the plunger 81 presses the locking pin 72, so that the locking pin 72 advances toward the side surface of the intermediate gear 43. When the locking pin 72 advances, if the locking pin 72 is opposed to, i.e., aligned with, one of the recesses 71, the locking pin 72 engages in this recess 71 as illustrated in FIGS. 5 and 6, so that the intermediate gear 43 is locked. This causes the rotor shaft 33a of the electric motor 30 to also be locked. Therefore, it is possible to de-energize the electric motor 30 and the linear solenoid 73, and thus to reduce the wasteful consumption of electric energy.

When the locking pin 72 advances, if the locking pin 72 is opposed to, i.e., aligned with, none of the recesses 71, the locking pin 72 can engage in none of the recesses 71. In this case, with the locking pin 72 kept in its advanced position, the intermediate gear 43 is rotated, by the electric motor 30, in the brake releasing direction, i.e., the direction to release the brake (direction indicated by one of the arrows in FIGS. 5 and 6) until the locking pin 72 is opposed to i.e., aligned with one of the recesses 71, thereby engaging the locking pin 72 in the one of the recesses 71.

While the intermediate gear 43 is locked due to the engagement of the locking pin 72 in one of the recesses 71 as described above, namely, while the rotor shaft 33a of the electric motor 30 is locked, the reaction force from the disk rotor 10 acts on the respective gears of the reduction gear mechanism 40 as a rotational force in the brake releasing direction. As a result, the first end surface of the recess 71 in which the locking pin 72 is engaged is strongly brought into contact with the locking pin 72, thereby keeping the locking pin 72 in engagement. Therefore, even after de-energizing the linear solenoid 73, the above reaction force keeps the locking pin 72 in engagement.

In order to unlock the rotor shaft 33a of the electric motor 30, since the linear solenoid 73 has already been de-energized, the electric motor 30 is simply activated to rotate the intermediate gear 43 in the braking direction, illustrated in FIG. 6. When the intermediate gear 43 is rotated in this direction, the locking pin 72 is disengaged from the first end surface of the recess 71, so that due to the pressing action of the return spring 86 or due to the pressing action of the tapered surface 75, i.e., the second end surface of the recess 71, by which the distal end portion of the locking pin 72 is pressed, the locking pin 72 moves axially backward until the locking pin 72 reaches the disengagement position in which the locking pin 72 is out of the recess 71.

At this time, the plunger 81 abuts against the end plate 77. This abutment elastically deforms the elastic members 88 and 90, and the elastic deformation of the elastic members 88 and 90 absorbs the impact force generated when the plunger 81 abuts against the end plate 77.

By the provision of a protrusion 74 extending from the one end surface of each recess 71 as illustrated in FIGS. 5 and 6, even if the recesses are shallow recesses formed simultaneously when forming the intermediate gear 43 by sintering, and each having an closed end wall and a depth of merely about several millimeters, it is possible to ensure a sufficient length of engagement between the locking pin 72 and the surface of each recess 71 including the protrusion 74. As a result thereof, since the intermediate gear 43 can be formed by sintering a metal, and the recesses 71 and the protrusions 74 can be formed at the same time as the intermediate gear 43 is formed by sintering, it is possible to dispense with post-processing or post-machining, and thus to reduce costs.

Since the recesses 71 have closed end walls, it is possible to prevent grease for gear lubrication from going into the recesses 71, and thus to prevent grease from being sucked into the linear solenoid 73 through the recesses 71, so that the function of the linear solenoid 73 does not deteriorate.

Figure 7:
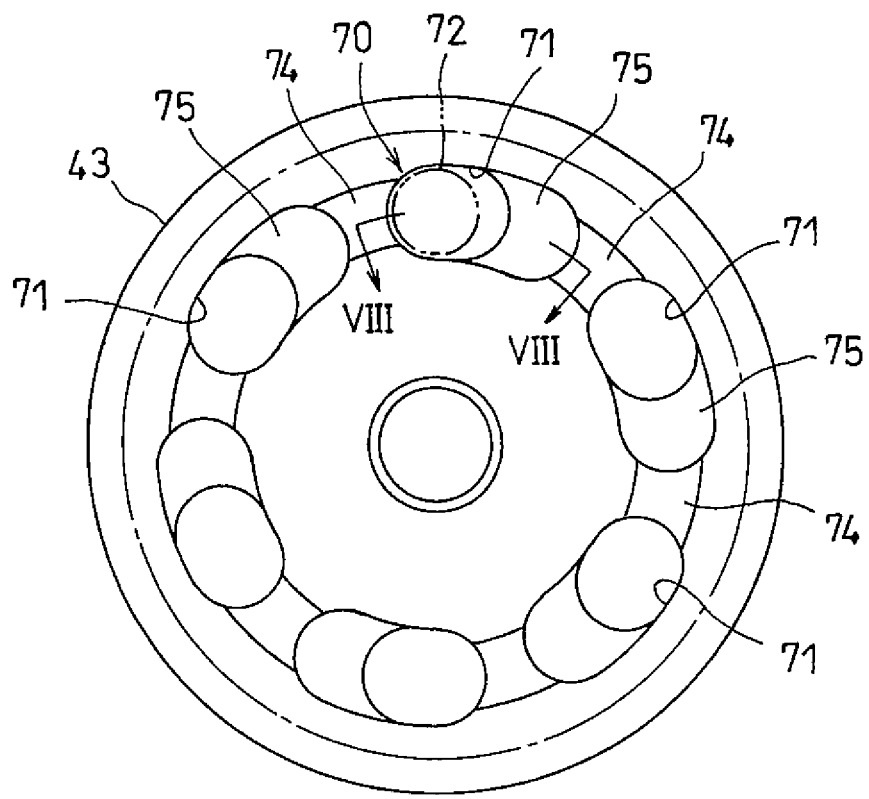
FIG. 7 is a front view of a different gear in which engagement portions are formed.
Figure 8:
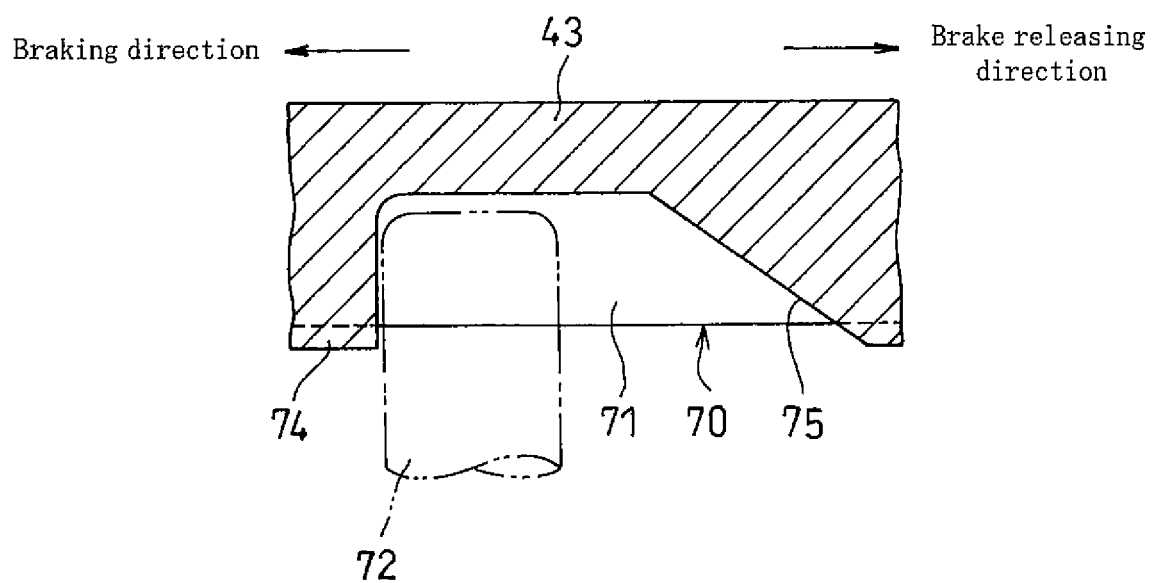
FIG. 8 is a sectional view taken along line VIII-VIII of FIG. 7.

As shown in FIGS. 5 and 6, the protrusions 74 are formed such that a space is defined between the protrusion 74 of each circumferentially adjacent pair of recesses 71 and the second end surface of the other adjacent recess 71. However, as illustrated in FIGS. 7 and 8, the protrusions 74 may be formed such that the protrusion 74 of one of each circumferentially adjacent pair of recesses 71 extends up to the second end surface of the other adjacent recess 71. The protrusions 74 illustrated in FIGS. 7 and 8 have higher strength and durability.

Figure 9:
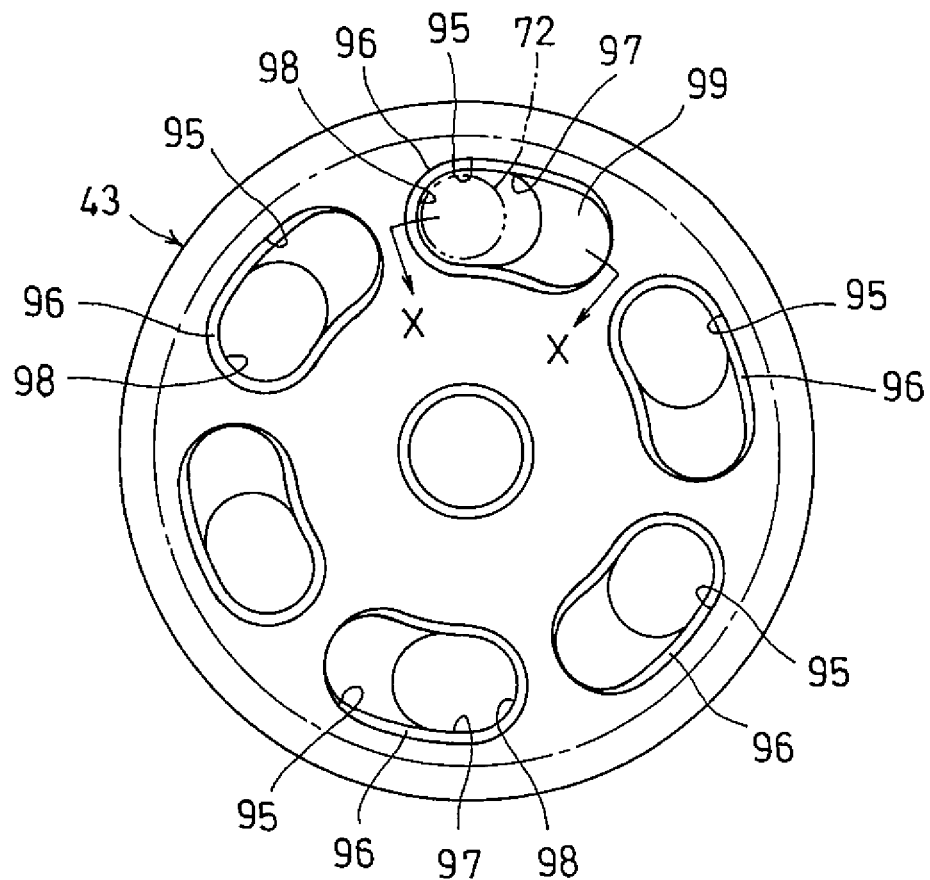
FIG. 9 is a front view of a still different gear in which engagement portions are formed.
Figure 10:
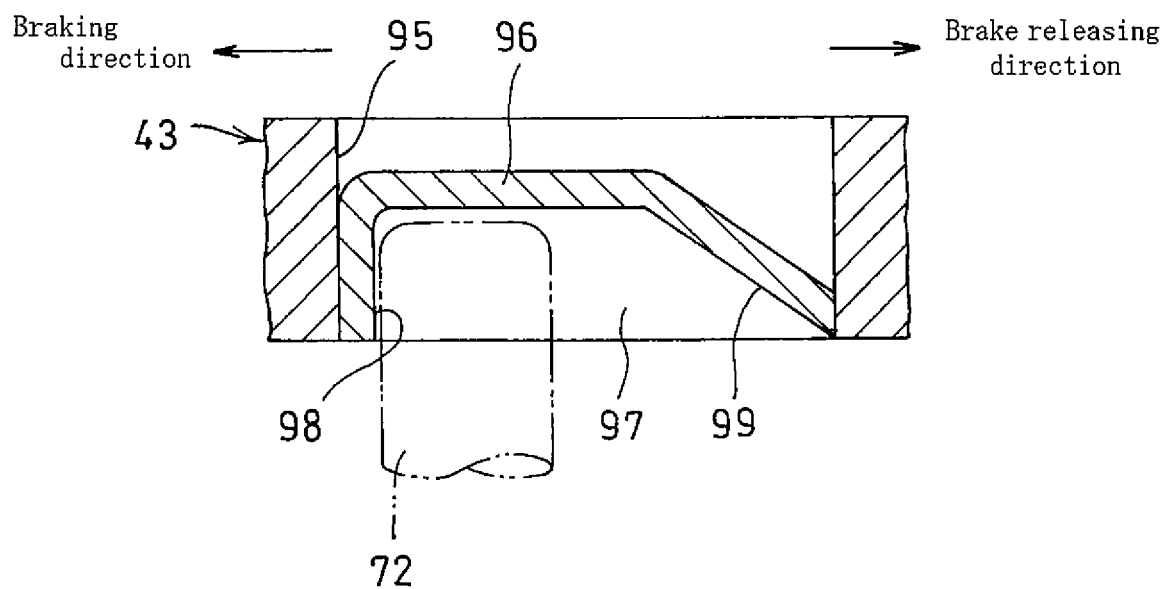
FIG. 10 is a sectional view taken along line X-X of FIG. 9.

FIGS. 9 and 10 illustrate different engagement portions formed in the intermediate gear 43 such that the locking pin 72 can engage in and disengage from any one of the engagement portions. In particular, in FIGS. 9 and 10, the intermediate gear 43 is formed with circular arc-shaped through holes 95 open to both side surfaces of the intermediate gear 43, and a lid 96 is attached to one open end portion of each through hole 95 which is more remote from the locking pin 72 than is the other open end portion of the through hole 95, to form a recess 97 as the engagement portion at the other open end portion of the through hole 95.

The lids 96 are formed by pressing a metal plate such that the recesses 97 are defined by the respective lids 96, and such that one end surface of each recess 97 constitutes an engagement surface 98 with which the locking pin 72 engages, and the other end surface thereof constitutes a tapered surface 99.

By, as described above, forming through holes 95 in the intermediate gear 43, and attaching lids 96 formed with recesses 97 as the engagement portions to the respective through holes 95, it is possible to obtain large engagement surfaces 98 for the locking pin 72, i.e., the portion of the locking pin 72 engaging with any of the engagement surfaces 98 is large/deep. Still, the intermediate gear 43 can be formed by sintering a metal, and thus can be manufactured at a low cost.

Also, by attaching the lids 96 to the respective through holes 95, and closing the end opening of each through hole 95 which is more remote from the locking pin 72 than is the other end opening thereof, it is possible to prevent grease for gear lubrication from going into the through holes 95, and thus to prevent grease from being sucked into the linear solenoid 73, illustrated in FIG. 3.

Figure 11:
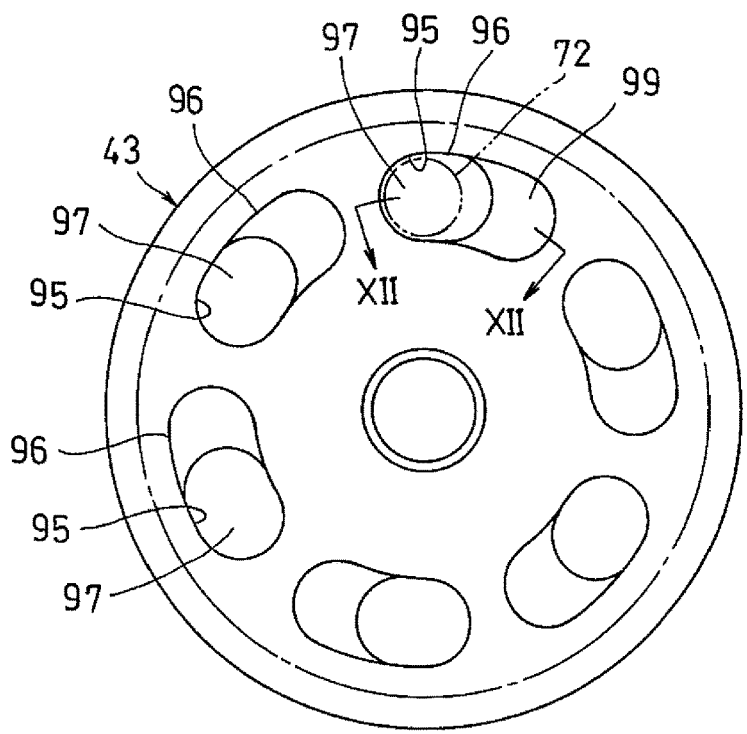
FIG. 11 is a front view of a yet different gear in which engagement portions are formed.
Figure 12:
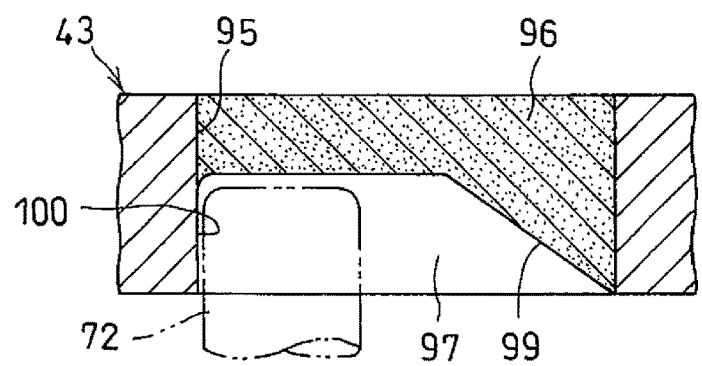
FIG. 12 is a sectional view taken along line XII-XII of FIG. 11.
Figure 13:
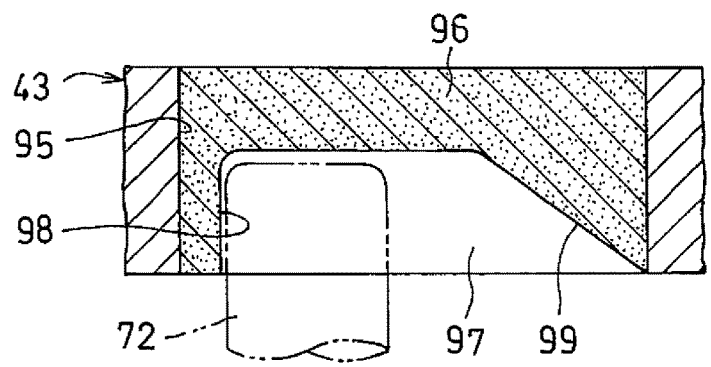
FIG. 13 is a sectional view of a different lid.

While the lids 96 are formed by pressing a metal plate in FIGS. 9 and 10, the lids 96 may be, as illustrated in FIGS. 11 to 13, formed of a resin.

As shown in FIGS. 10 and 13, lids 96 are used, each having a recess 97 formed with both the tapered surface 99 and the engagement surface 98 for the locking pin 72. However, in the embodiment illustrated in FIG. 12, a lid 96 having only the tapered surface 99 at its end, and not having the engagement surface 98, is attached to the open end portion of each through hole 95 remote from the locking pin 72, to define a recess 97 as the engagement portion at the other open end portion of the through hole 95. The recess 97 includes the tapered surface 99 at the second end of the recess 97, and at the first end thereof an engagement surface 100 which is defined by one side surface of the through hole 95, and with which the locking pin 72 engages and from which the locking pin 72 disengages.

The lids 96 may be attached by either adhesion or press fitting.

DESCRIPTION OF REFERENCE NUMERALS

10: disk rotor
14: brake pad
21: outer ring member (sliding member)
30: electric motor
33a: rotor shaft
40: reduction gear mechanism
42: output gear
43: intermediate gear
50: rotation-to-linear motion converting mechanism
70: locking mechanism
71: recess (engagement portion)
72: locking pin
73: linear solenoid (pin driving actuator)
74: protrusion
75: tapered surface
95: through hole
96: lid
97: recess (engagement portion)
99: tapered surface

The invention claimed is:
1. An electric linear motion actuator comprising:
an electric motor having a rotor shaft;
a reduction gear mechanism comprising a plurality of gears including an output gear, and configured such that a rotation of the rotor shaft of the electric motor is reduced in speed and output by the reduction gear mechanism;
a rotation-to-linear motion converting mechanism comprising a rotating member threadedly engaging a non-rotatable and axially slidable sliding member to convert a rotational motion of the output gear of the reduction gear mechanism to an axial linear motion of the sliding member; and
a locking mechanism configured to lock and unlock the rotation of the rotor shaft of the electric motor, the locking mechanism including:
a plurality of engagement portions formed in one gear of the plurality of gears of the reduction gear mechanism other than the output gear;
a locking pin movable toward and away from the engagement portions, the locking pin being configured such that when the locking pin moves toward the engaging portions, the locking pin engages in one of the engagement portions and locks the one gear; and
a pin driving actuator configured to move the locking pin toward and away from the engagement portions,
wherein each of the engagement portions comprises a recess having a first end surface configured such that when the locking pin engages with the first end surface of any one of the engagement portions, the one gear is locked by the locking mechanism, the recess also having a second end surface opposite the first end surface, the recess of each of the engagement portions being formed within an engagement face of the one gear such that the recess does not extend entirely through the one gear in a width direction of the one gear,
wherein a protrusion extends from the engagement face at only the first end surface of the recess of each of the engagement portions without any protrusion at the second end surface, and
wherein the one gear is formed of a sintered metal.

2. The electric linear motion actuator according to claim 1, wherein the second end surface of the recess of each of the engagement portions comprises a tapered surface configured to apply to the locking pin an axial force that tends to retract the locking pin when the one gear rotates in a braking direction in which a braking force increases.

3. An electric linear motion actuator comprising:
an electric motor having a rotor shaft;
a reduction gear mechanism comprising a plurality of gears including an output gear, and configured such that a rotation of the rotor shaft of the electric motor is reduced in speed and output by the reduction gear mechanism;
a rotation-to-linear motion converting mechanism comprising a rotating member threadedly engaging a non-rotatable and axially slidable sliding member to convert a rotational motion of the output gear of the reduction gear mechanism to an axial linear motion of the sliding member; and
a locking mechanism configured to lock and unlock the rotation of the rotor shaft of the electric motor, the locking mechanism including:
a plurality of engagement portions formed in one gear of the plurality of gears of the reduction gear mechanism other than the output gear;
a locking pin movable toward and away from the engagement portions, the locking pin being configured such that when the locking pin moves toward the engaging portions, the locking pin engages in one of the engagement portions and locks the one gear; and
a pin driving actuator configured to move the locking pin toward and away from the engagement portions,
wherein the one gear has through holes,
wherein each of the engagement portions comprises a recess formed by attaching a lid to the one gear such that an entirety of the lid is located entirely within a respective one of the through holes and closes the respective one of the through holes, and such that an opening of the recess faces the locking pin so as to receive an end of the locking pin therein,
wherein the one gear is formed of a sintered metal;
wherein the lid of the recess of each of the engagement portions has a tapered surface configured to apply to the locking pin an axial force to retract the locking pin when the one gear rotates in a braking direction in which a braking force increases, the lid of each of the engagement portions being inserted in the respective one of the through holes such that an end of the tapered surface is flush with an engagement face of the one gear, the engagement face of the one gear facing the locking pin.

4. The electric linear motion actuator according to claim 3, wherein the lid of the recess of each of the engagement portions is formed of a resin or a metal.

5. The electric linear motion actuator according to claim 3, wherein the lid of the recess of each of the engagement portions is shaped to form the respective recess.

6. An electromechanical brake system comprising:
a brake pad;
a disk rotor; and the electric linear motion actuator according to claim 1 and configured to linearly drive the brake pad such that the brake pad is pressed against the disk rotor, thereby applying a braking force to the disk rotor, wherein the sliding member of the electric linear motion actuator is configured to linearly drive the brake pad.

7. An electromechanical brake system comprising:

a brake pad;

a disk rotor; and the electric linear motion actuator according to claim 4 and configured to linearly drive the brake pad such that the brake pad is pressed against the disk rotor, thereby applying a braking force to the disk rotor, wherein the sliding member of the electric linear motion actuator is configured to linearly drive the brake pad.

8. The electric linear motion actuator according to claim 1, wherein the sliding member comprises a ring member, and the rotating member comprises a plurality of planetary rollers.

9. The electric linear motion actuator according to claim 3, wherein the sliding member comprises a ring member, and the rotating member comprises a plurality of planetary rollers.

10. The electric linear motion actuator according to claim 4, wherein the lid of the recess of each of the engagement portions is shaped to form the respective recess.

* * * * *